(12) United States Patent
Hayasaka et al.

(10) Patent No.: US 12,427,578 B2
(45) Date of Patent: Sep. 30, 2025

(54) MACHINING APPARATUS AND CUTTING METHOD

(71) Applicants: National University Corporation Tokai National Higher Education and Research System, Nagoya (JP); OKUMA CORPORATION, Aichi (JP); MURATA MACHINERY, LTD., Kyoto (JP)

(72) Inventors: Takehiro Hayasaka, Nagoya (JP); Soohyun Nam, Nagoya (JP); Eiji Shamoto, Nagoya (JP)

(73) Assignees: NATIONAL UNIVERSITY CORPORATION TOKAI NATIONAL HIGHER EDUCATION AND RESEARCH SYSTEM, Aichi (JP); MURATA MACHINERY, LTD., Aichi (JP); OKUMA CORPORATION, Kyoto (JP)

( * ) Notice: Subject to any disclaimer, the term of this patent is extended or adjusted under 35 U.S.C. 154(b) by 1197 days.

(21) Appl. No.: 17/164,323

(22) Filed: Feb. 1, 2021

(65) Prior Publication Data
US 2021/0154746 A1 May 27, 2021

Related U.S. Application Data

(63) Continuation of application No. PCT/JP2019/026969, filed on Jul. 8, 2019.

(30) Foreign Application Priority Data

Aug. 9, 2018 (JP) ................... 2018-149918

(51) Int. Cl.
*B23Q 15/12* (2006.01)
*B23B 1/00* (2006.01)

(52) U.S. Cl.
CPC ............. *B23B 1/00* (2013.01); *B23Q 15/12* (2013.01); *B23B 2250/16* (2013.01); *G05B 2219/41256* (2013.01)

(58) Field of Classification Search
CPC ......... B23B 1/00; B23B 7/00; B23B 2250/16; B23B 25/06; B23Q 15/12; G05B 2219/41256
See application file for complete search history.

(56) References Cited

U.S. PATENT DOCUMENTS 5,440,398 A * 8/1995 Holowko .................. B41C 1/04
  358/3.29
7,089,838 B2 * 8/2006 Erickson ................. B23B 27/16
  82/158

(Continued)

FOREIGN PATENT DOCUMENTS

DE  10 2013 110 824 A1  4/2024
JP       S49105277 A    10/1974

(Continued)

*Primary Examiner* — Sara Addisu
(74) *Attorney, Agent, or Firm* — MUNCY, GEISSLER, OLDS & LOWE, P.C.

(57) ABSTRACT

A rotation mechanism rotates a spindle to which a cutting tool or a workpiece is attached. A rotation controller controls the rotation of the spindle by the rotation mechanism. A feed mechanism moves the cutting tool relative to the workpiece. The rotation controller alternately exercises acceleration control under which the rotation of the spindle is accelerated to make a speed fluctuation ratio between the current cutting speed and a cutting speed one rotation before at the same rotation position equal to or greater than the first value that is greater than 1 and deceleration control under which the rotation of the spindle is decelerated to make the speed fluctuation ratio equal to or less than the second value that is less than 1.

6 Claims, 6 Drawing Sheets

(56) References Cited

U.S. PATENT DOCUMENTS

| | | | | |
|---|---|---|---|---|
| 7,849,769 | B2* | 12/2010 | Akiyama | B23B 5/48 |
| | | | | 82/159 |
| 10,016,815 | B2* | 7/2018 | Ishihara | B23B 1/00 |
| 10,675,688 | B2* | 6/2020 | Akiyama | B23D 11/00 |
| 2014/0102268 | A1* | 4/2014 | Hariki | B23Q 5/28 |
| | | | | 82/117 |
| 2017/0322538 | A1* | 11/2017 | Watanabe | G05B 19/4093 |
| 2018/0239328 | A1* | 8/2018 | Oikawa | G05B 19/416 |
| 2020/0156200 | A1* | 5/2020 | Nakaya | G05B 19/19 |
| 2020/0238465 | A1* | 7/2020 | Nakaya | B23Q 17/22 |
| 2020/0269458 | A1* | 8/2020 | Shamoto | G05B 19/4086 |
| 2021/0389747 | A1* | 12/2021 | Noguchi | G05B 19/4083 |
| 2022/0161339 | A1* | 5/2022 | Sannomiya | B23G 1/04 |
| 2022/0334565 | A1* | 10/2022 | Naiki | G05B 19/41875 |
| 2023/0025421 | A1* | 1/2023 | Noda | B23B 1/00 |
| 2023/0050486 | A1* | 2/2023 | Sannomiya | G05B 19/186 |
| 2023/0103408 | A1* | 4/2023 | Fujise | B23B 1/00 |
| | | | | 82/1.11 |

FOREIGN PATENT DOCUMENTS

| | | |
|---|---|---|
| JP | 2005-144580 A | 6/2005 |
| JP | 2012-130997 A | 7/2012 |
| JP | 2016-163918 A | 9/2016 |

\* cited by examiner

MACHINING APPARATUS AND CUTTING METHOD

CROSS REFERENCE TO RELATED APPLICATIONS

This application is a continuation of application No. PCT/JP2019/026969, filed on Jul. 8, 2019, and claims the benefit of priority from Japanese Patent Application No. 2018-149918, filed on Aug. 9, 2018, the entire contents of which are incorporated herein by reference.

TECHNICAL FIELD

The present disclosure relates to a machining apparatus and a cutting method.

BACKGROUND ART

In the related art, machining apparatuses each having a cutting tool or workpiece attached to a rotatable spindle bring the cutting tool into contact with the workpiece while rotating the spindle to cut the workpiece. In such a machining apparatus, "regenerative chatter vibration" corresponding to vibration of the workpiece and/or the cutting tool may occur.

"Regenerative chatter vibration" is self-excited vibration in which the vibration that occurred during cutting one rotation before (one blade before with a multi-edged tool) remains as an undulation on a machined surface and the cutting thickness fluctuates during the current cutting by the regeneration of the vibration. This forms a closed loop in which a change in cutting force generates vibration again, and when the loop gain becomes larger, the vibration grows and becomes large chatter vibration. "Regenerative chatter vibration" may become a factor to not only deteriorate finishing accuracy of a machined surface, but also chip the cutting tool.

The rotation speed of the spindle, that is, the cutting speed is controlled so as to make the current cutting speed different, to a sufficient degree, from a cutting speed one rotation before at a certain rotation position (rotation angle), thereby suppressing growth of regenerative chatter vibration. Patent Literature 1 discloses a method for suppressing, when turning process is applied to a workpiece, "chatter vibration" by changing a rotation speed of a spindle at short intervals with a feed speed of a cutting tool kept constant.

PATENT LITERATURE

[Patent Literature 1] JP S49-105277 A

SUMMARY

Technical Problem

When the rotation speed of the spindle is periodically changed, a ratio between the current speed and the speed one rotation before becomes close to 1 before and after a switch between an increase and decrease in the rotation speed. In the related art, the rotation speed of the spindle may be periodically changed in accordance with a fluctuation pattern of a triangle wave in order to suppress regenerative chatter vibration. However, as a result of analyzing the fluctuation pattern of a triangle wave, the present discloser has found out that the regenerative chatter vibration may occur before and after the rotation speed reaches its local maximum value. The present discloser has repeated research on periodic fluctuation patterns of the rotation speed of the spindle, and has come to identify a fluctuation pattern that effectively suppresses the regenerative chatter vibration.

The present disclosure has been made in view of such circumstances, and it is therefore an object of the present disclosure to provide a cutting technique for effectively suppressing regenerative chatter vibration.

Solution to Problem

In order to solve the above-described problem, a machining apparatus according to one aspect of the present disclosure includes a rotation mechanism structured to rotate a spindle to which a cutting tool or workpiece is attached, a rotation controller structured to control the rotation of the spindle by the rotation mechanism, and a feed mechanism structured to move the cutting tool relative to the workpiece. The rotation controller alternately exercises acceleration control under which the rotation of the spindle is accelerated to make a speed fluctuation (variation) ratio between a current cutting speed and a cutting speed one rotation before at the same rotation position equal to or greater than a first value that is greater than 1 and deceleration control under which the rotation of the spindle is decelerated to make the speed fluctuation ratio equal to or less than a second value that is less than 1.

Provided according to another aspect of the present disclosure is a cutting method. This method includes a rotation control step of controlling rotation of a spindle to which a cutting tool or workpiece is attached, and a machining step of moving, while the spindle is rotating, the cutting tool relative to the workpiece to cause the cutting tool to cut the workpiece. In the rotation control step, acceleration control under which the rotation of the spindle is accelerated to make a speed fluctuation ratio between a current cutting speed and a cutting speed one rotation before at the same rotation position equal to or greater than a first value that is greater than 1 and deceleration control under which the rotation of the spindle is decelerated to make the speed fluctuation ratio equal to or less than a second value that is less than 1 are alternately exercised.

Note that any combination of the above-described components, or an entity that results from replacing expressions of the present disclosure among a method, an apparatus, a system, and the like is also valid as an embodiment of the present disclosure.

BRIEF DESCRIPTION OF DRAWINGS

FIG. 6 is a diagram showing a structure of a machining apparatus according to an embodiment in which the cutting tool 10 is attached to the spindle 2a.

DESCRIPTION OF EMBODIMENTS

Figure 1:
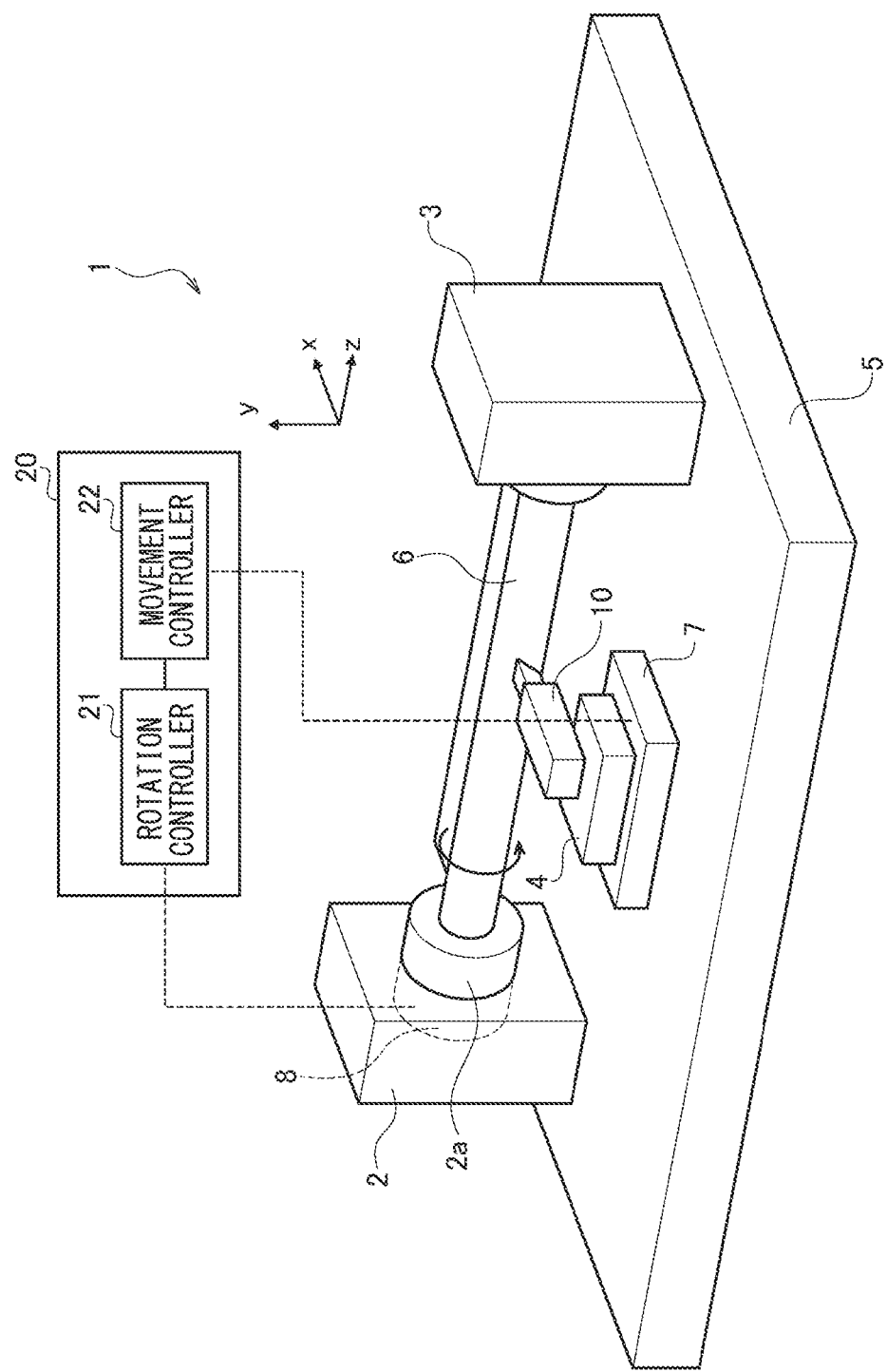
FIG. 1 is a diagram showing a structure of a machining apparatus according to an embodiment.

FIG. 1 shows a structure of a machining apparatus 1 according to an embodiment. The machining apparatus 1 is a cutting apparatus that brings a cutting edge of a cutting tool 10 into contact with a workpiece (to-be-cut object) 6 to turn the workpiece 6. The machining apparatus 1 includes, on a bed 5, a headstock 2 and a tailstock 3 that support the workpiece 6 rotatable and a tool post 4 that supports the cutting tool 10. A rotation mechanism 8 is provided inside the headstock 2 and rotates a spindle 2a to which the workpiece 6 is attached. A feed mechanism 7 is provided on the bed 5 and moves the cutting tool 10 relative to the workpiece 6. In this machining apparatus 1, the feed mechanism 7 moves the tool post 4 in X-axis, Y-axis, and Z-axis directions to move the cutting tool 10 relative to the workpiece 6. Herein, the X-axis direction is a horizontal direction and deep-cutting direction orthogonal to an axis of the workpiece 6, the Y-axis direction is a cutting direction that coincides with a vertical direction, and the Z-axis direction is a feed direction parallel to the axis of the workpiece 6.

A controller 20 includes a rotation controller 21 structured to control the rotation of the spindle 2a by the rotation mechanism 8, and a movement controller 22 structured to cause, while the spindle 2a is rotating, the feed mechanism 7 to bring the cutting tool 10 into contact with the workpiece 6 to cause the cutting tool 10 to cut the workpiece 6. The machining apparatus 1 may be a numerical control (NC) machine tool. The rotation mechanism 8 and the feed mechanism 7 each include a drive unit such as a motor, and the rotation controller 21 and the movement controller 22 each adjust power to be supplied to a corresponding drive unit to control behavior of a corresponding one of the rotation mechanism 8 and the feed mechanism 7.

Figure 6:
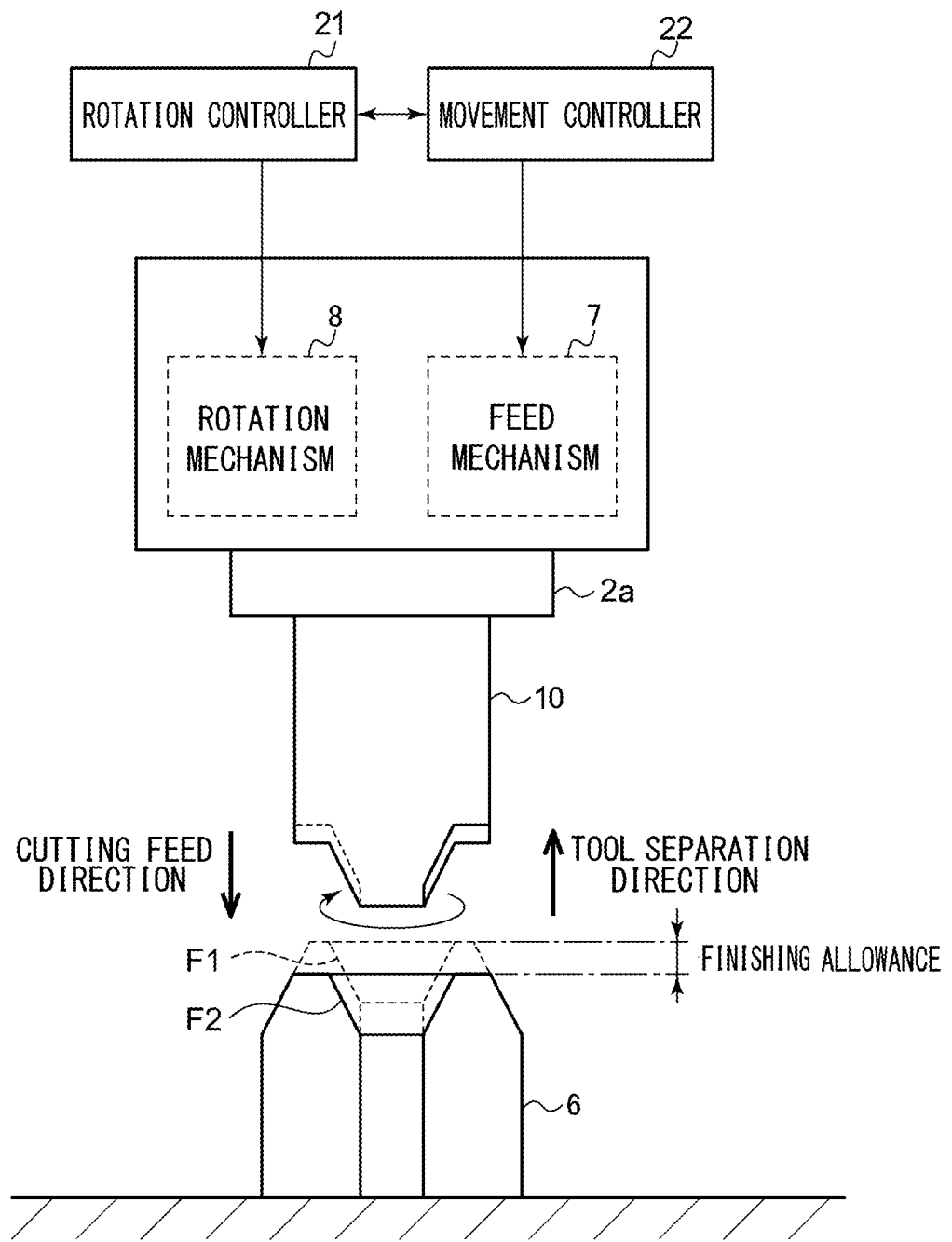

Note that, in the machining apparatus 1 according to the embodiment, the workpiece 6 is attached to the spindle 2a and is rotated by the rotation mechanism 8, but another example, as illustrated in FIG. 6, may be employed where the cutting tool 10 is attached to the spindle 2a and is rotated by the rotation mechanism 8. Further, the feed mechanism 7 only needs to move the cutting tool 10 relative to the workpiece 6 and have a mechanism for moving at least either the cutting tool 10 or the workpiece 6.

It is known that, in such a machining apparatus 1, making the current cutting speed different, to a sufficient degree, from a cutting speed one rotation before at a certain rotation position suppresses growth of regenerative chatter vibration. The present discloser has focused on the ratio between the current cutting speed and the cutting speed one rotation before, and has studied fluctuation patterns of the rotation speed of the spindle that suppress the growth of regenerative chatter vibration. Hereinafter, the ratio between the current cutting speed and the cutting speed one rotation before at the same rotation position is referred to as a "speed fluctuation ratio".

Before describing a fluctuation pattern applied to the embodiment, a fluctuation pattern of a triangle wave conventionally used for suppressing the growth of regenerative chatter vibration will be examined.

Figure 2A:
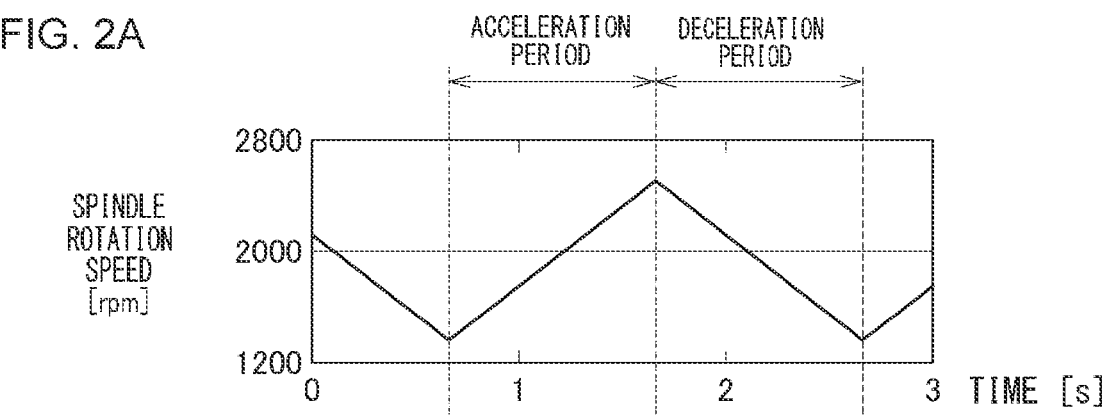
FIGS. 2(*a*) to 2(*c*) are diagrams showing a simulation result when a rotation speed of a spindle is controlled in accordance with a fluctuation pattern of a triangle wave.

FIG. 2(a) shows a fluctuation pattern of a triangle wave of the rotation speed of the spindle. Each cycle of this fluctuation pattern is two seconds long, and the speed is changed, at constant acceleration and constant deceleration, within a range of a local minimum value of 1400 rpm to a local maximum value of 2600 rpm. An acceleration period from the local minimum value to the local maximum value and a deceleration period from the local maximum value to the local minimum value are each one second long.

Figure 2B:
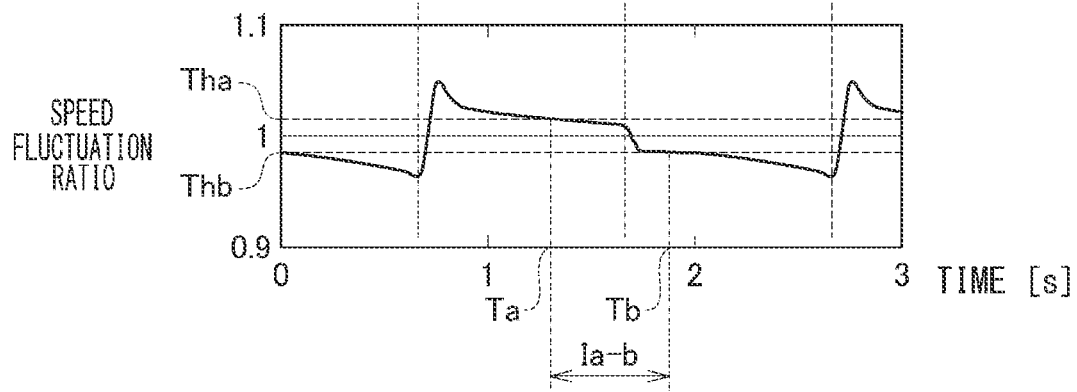

FIG. 2(b) shows a transition pattern of the speed fluctuation ratio. As described above, the speed fluctuation ratio is derived from the following equation:

Speed fluctuation ratio=(current cutting speed/cutting speed one rotation before).

The fluctuation pattern shown in FIG. 2(a) exhibits a characteristic where the speed fluctuation ratio exceeds 1 and then gradually decreases in the period of accelerating the rotation of the spindle, and the speed fluctuation ratio falls below 1 and then gradually decreases in the period of decelerating the rotation of the spindle.

Figure 2C:
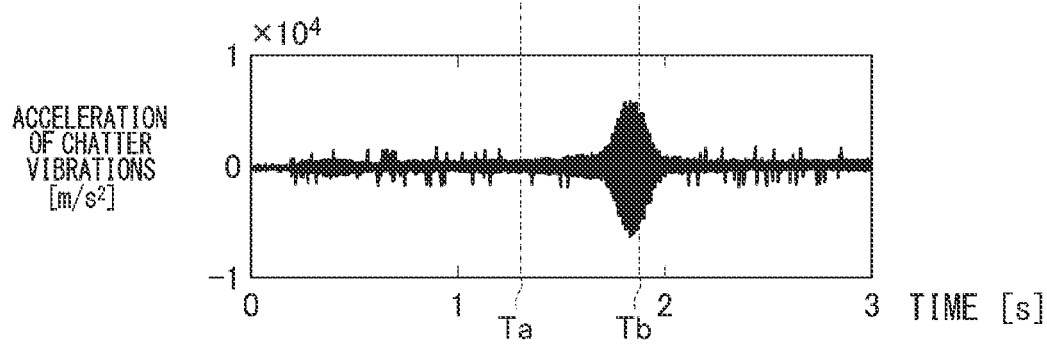

FIG. 2(c) shows changes in acceleration of chatter vibration. This simulation result shows that the acceleration of chatter vibration continues to increase in a period from a time Ta to just before a time Tb, showing growth of chatter vibration. At the time Tb, the acceleration of chatter vibration begins to decrease, which shows that at the time Tb, the effect of suppressing chatter vibration begins to be exerted. The present discloser has checked the transition pattern of the speed fluctuation ratio shown in FIG. 2(b), and found out that the factor that causes the vibration acceleration to increase in a period Ia-b from the time Ta to the time Tb correlates with the value of the speed fluctuation ratio.

In FIG. 2(b), the speed fluctuation ratio at the time Ta is Tha (>1), and the speed fluctuation ratio at the time Tb is Thb (<1). Since the acceleration of chatter vibration begins to increase at the time Ta and begins to decrease at the time Tb, speed fluctuation ratios in a range of Thb to Tha, both inclusive, fail to suppress the growth of regenerative chatter vibration. The present discloser has found out by checking a relationship between Tha and Thb that a value resulting from subtracting 1 from Tha (Tha−1) and a value resulting from subtracting Thb from 1 (1−Thb) are approximately equal to each other.

A comparison between a value near the local maximum value of the rotation speed of the spindle and a value near the local minimum value of the rotation speed of the spindle shows that regenerative chatter vibration occurs near the local maximum value of the rotation speed of the spindle, but does not occur near the local minimum value of the rotation speed of the spindle. This is considered that the growth of regenerative chatter vibration requires a certain time after the acceleration of chatter vibration begins to increase, but a period in which the speed fluctuation ratio falls within a range of Thb to Tha, both inclusive, is short near the local minimum value of the rotation speed of the spindle, and thus the regenerative chatter vibration does not occur.

On the other hand, it is presumed that, from the simulation result of the vibration acceleration shown in FIG. 2(c), near the local maximum value of the rotation speed of the spindle, the period Ia-b in which the speed fluctuation ratio falls within the range of Thb to Tha, both inclusive, is long enough for the growth of regenerative chatter vibration. From the above-described consideration, when the rotation speed of the spindle is controlled in accordance with the fluctuation pattern of a triangle wave shown in FIG. 2(a), the period Ia-b in which the speed fluctuation ratio is close to 1 becomes longer near the local maximum value, so that it is obvious that the fluctuation pattern fails to suppress the occurrence of regenerative chatter vibration.

Hereinafter, in FIGS. 3 and 4, simulation results from comparing fluctuation patterns of a triangle wave with the fluctuation pattern according to the embodiment are shown. Both the fluctuation patterns have a cycle of three seconds.

Figure 3A:
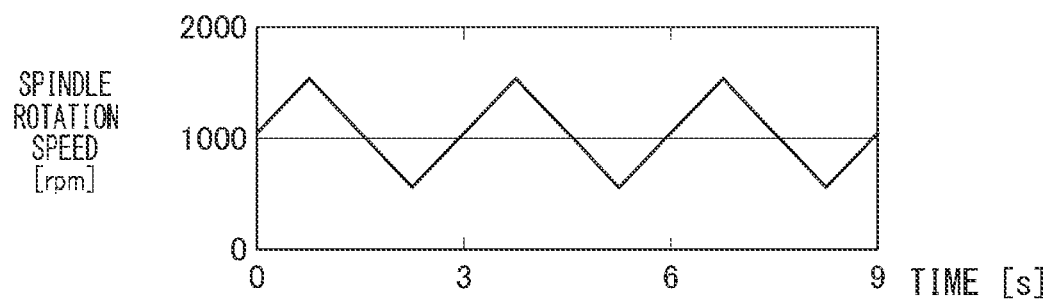
FIGS. 3(*a*) to 3(*c*) are diagrams showing a simulation result when the rotation speed of the spindle is controlled in accordance with a fluctuation pattern of a triangle wave.

FIG. 3(a) shows a fluctuation pattern of a triangle wave of the rotation speed of the spindle. In this fluctuation pattern, the acceleration period from the local minimum value to the local maximum value and the deceleration period from the local maximum value to the local minimum value are made equal to each other.

Figure 3B:
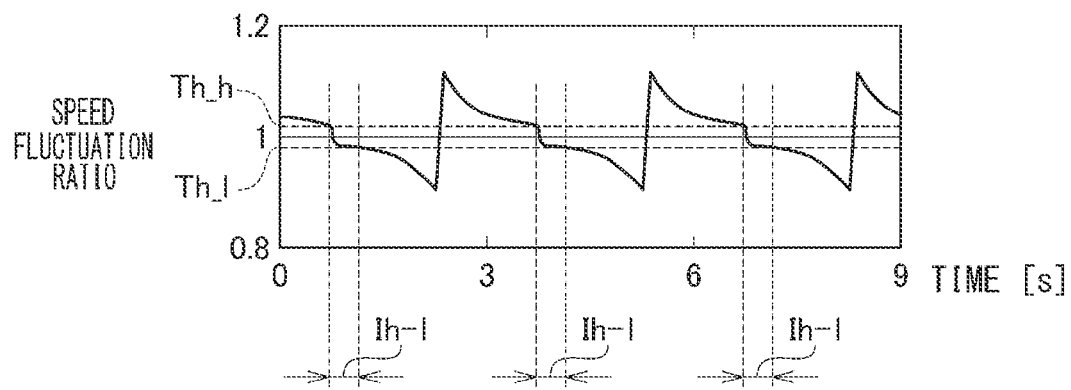
Figure 3C:
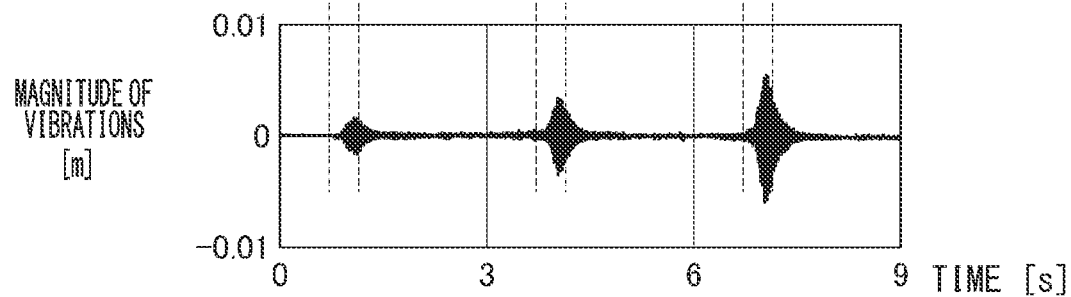

FIG. 3(b) shows a transition pattern of the speed fluctuation ratio, and FIG. 3(c) shows changes in vibration magnitude of chatter vibration. At a timing when, near the local maximum value of the rotation speed of the spindle, the speed fluctuation ratio falls below Th_h (>1), the acceleration of chatter vibration begins to increase, and at a timing when the speed fluctuation ratio falls below Th_l (<1), chatter vibration begins to subside. FIG. 3(c) shows a state where the chatter vibration grows in a period Ih-l from the timing when the speed fluctuation ratio becomes Th_h (>1) to the timing when the speed fluctuation ratio becomes Th_l (<1).

Figure 4A:
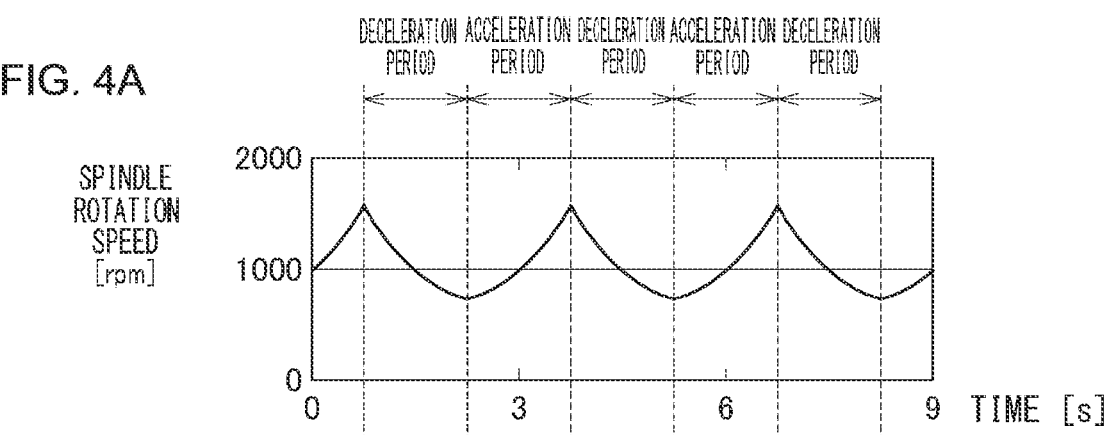
FIGS. 4(*a*) to 4(*c*) are diagrams showing a simulation result when the rotation speed of the spindle is controlled in accordance with a fluctuation pattern according to the embodiment.

FIG. 4(a) shows a fluctuation pattern of the rotation speed of the spindle according to the embodiment. The fluctuation pattern of the rotation speed of the spindle according to the embodiment has a waveform pattern in which the acceleration period from the local minimum value to the local maximum value and the deceleration period from the local maximum value to the local minimum value are equal in length to each other. In this fluctuation pattern, the acceleration period and the deceleration period are each set equal to 1.5 seconds, and the acceleration period and the deceleration period are alternately repeated.

Figure 4B:
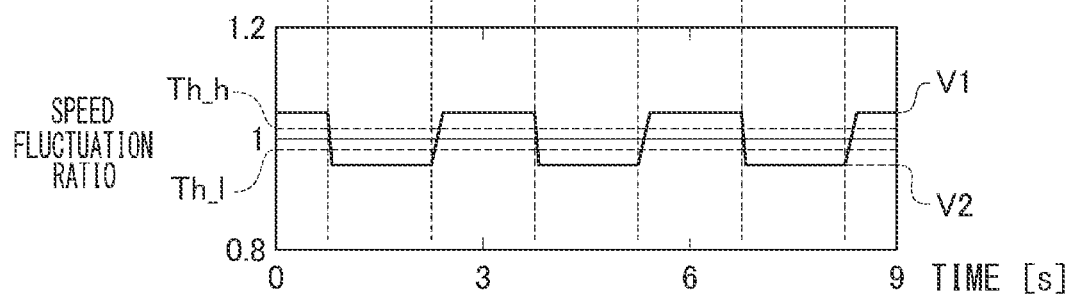

FIG. 4(b) shows a transition pattern of the speed fluctuation ratio based on the fluctuation pattern according to the embodiment. The rotation controller 21 is capable of alternately exercising acceleration control under which the rotation of the spindle 2a is accelerated to make the speed fluctuation ratio equal to a first value (V1) that is greater than 1 and deceleration control under which the rotation of the spindle 2a is decelerated to make the speed fluctuation ratio equal to a second value (V2) that is less than 1.

The rotation controller 21 maintains the speed fluctuation ratio at V1 in at least part of the period of accelerating the rotation of the spindle, and maintains the speed fluctuation ratio at V2 in at least part of the period of decelerating the rotation of the spindle. The rotation controller 21 according to the embodiment changes the speed fluctuation ratio from V2 to V1 in the period of accelerating the rotation of the spindle and then maintains the speed fluctuation ratio at V1, and changes the speed fluctuation ratio from V1 to V2 in the period of decelerating the rotation of the spindle and then maintains the speed fluctuation ratio at V2. In the acceleration period, a ratio of the time to change the speed fluctuation ratio from V2 to V1 to the time to maintain the speed fluctuation ratio at V1 is preferably equal to or less than 1/7. Similarly, in the deceleration period, a ratio of the time to change the speed fluctuation ratio from V1 to V2 to the time to maintain the speed fluctuation ratio at V2 is preferably equal to or less than 1/7. In order to make the acceleration period and the deceleration period equal in length to each other and to make a continuous profile, the rotation controller 21 may set V1 and V2 to make a value resulting from multiplying V1 by V2 equal to 1. For example, when V1 is set equal to 1.03, V2 may be set equal to 1/1.03, that is, V2 may be the reciprocal of V1.

In FIG. 4(b), chatter vibration may occur at a speed fluctuation ratio that falls within a range of Th_l to Th_h, both inclusive. Th_l, Th_h serving as thresholds may be calculated through simulation or derived through experiment. Note that, referring to the simulation result shown in FIGS. 2(a) to 2(c), the time Tb at which the effect of suppressing chatter vibration begins to be exerted is derived, so that the speed fluctuation ratio Thb (Th_l) at that time can be uniquely derived. Further, as described above, since (Tha (Th_h)−1) and (1−Thb (Th_l)) have an equal relationship, when Thb (Th_l) is obtained, Tha (Th_h) is also obtained. As described above, the thresholds Th_l, Th_h can be derived from the simulation result. The rotation controller 21 sets the first value (V1) for the acceleration control higher than the threshold Th_h, and sets the second value (V2) for the deceleration control lower than the threshold Th_l.

Even in the fluctuation pattern shown in FIG. 4(a), a period in which the speed fluctuation ratio falls within the range of Th_l to Th_h, both inclusive, occurs near the local maximum value and local minimum value of the rotation speed of the spindle. However, the rotation controller 21 alternately switches between the acceleration control under which the acceleration of the rotation of the spindle is continuously increased to make the speed fluctuation ratio equal to the first value (V1), and the deceleration control under which the deceleration of the rotation of the spindle is continuously decreased to make the speed fluctuation ratio equal to the second value (V2), thereby allowing the period in which the speed fluctuation ratio falls within the range of Th_l to Th_h, both inclusive, to be extremely short. A comparison with the period Ih-l (see FIG. 3(b)) in the fluctuation pattern of a triangle wave clearly shows the difference.

The rotation controller 21 may alternately switch between the acceleration control and the deceleration control to shorten the period in which the speed fluctuation ratio falls within the range of Th_l to Th_h, both inclusive, to a degree that prevents chatter vibration from growing. For example, even when the speed fluctuation ratio momentarily becomes less than V1 in the acceleration period or the speed fluctuation ratio momentarily exceeds V2 in the deceleration period due to fluctuations in power supply voltage or the like, the machining apparatus 1 that exercises the acceleration control to maintain the speed fluctuation ratio at V1 in the acceleration period and exercises the deceleration control to maintain the speed fluctuation ratio at V2 in the deceleration period falls within the technical scope of the present disclosure.

Figure 4C:
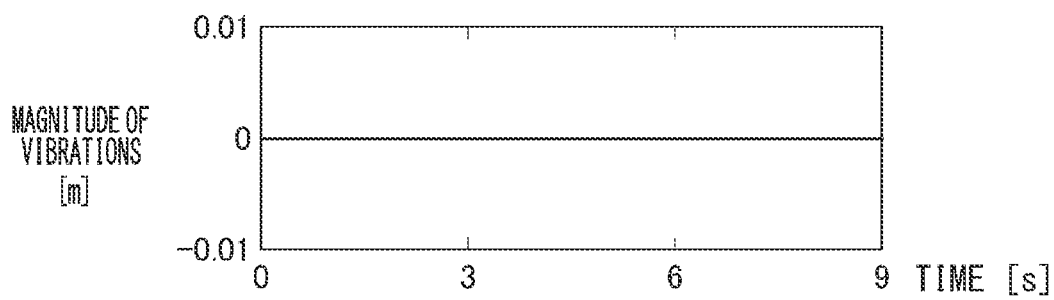

FIG. 4(c) shows changes in vibration magnitude of chatter vibration. The simulation result of the fluctuation pattern according to the embodiment shows that the occurrence of chatter vibration can be effectively suppressed. The rotation controller 21 exercises the acceleration control to maintain the speed fluctuation ratio at the first value (V1) at all rotation positions about the rotation axis of the spindle, and exercises the deceleration control to maintain the speed fluctuation ratio at the second value (V2) at all the rotation positions about the rotation axis of the spindle. Therefore, while the rotation speed of the spindle is put under the acceleration control exercised by the rotation controller 21, the current speed becomes equal to V1 (>Th_h) times the speed one rotation before at all the rotation positions, which makes it possible to suppress the occurrence of regenerative chatter vibration. Further, while the rotation speed of the spindle is put under the deceleration control exercised by the rotation controller 21, the current speed becomes equal to V2 (<Th_l) times the speed one rotation before at all rotation positions, which makes it possible to suppress the occurrence of regenerative chatter vibration.

As described above, the machining apparatus 1 causes the rotation controller 21 to alternately switch between the acceleration control and deceleration control on the rotation speed of the spindle to suppress the occurrence of regenerative chatter vibration. This makes it possible to suppress tool wear or achieve machining with excellent finishing accuracy when the finished surface always remains. The present discloser has found out through various simulations that the effect of suppressing the occurrence of regenerative chatter vibration is particularly high with a fluctuation pattern having a relatively long cycle, for example, a fluctuation pattern having a cycle of at least one second.

The present disclosure has been described on the basis of the embodiment. It is to be understood by those skilled in the art that the embodiment is illustrative and that various modifications are possible for a combination of components or processes, and that such modifications are also within the scope of the present disclosure. According to the embodiment, the acceleration period and the deceleration period are set equal in length to each other, but may be different in length from each other.

According to the embodiment, the rotation controller 21 alternately exercises the acceleration control under which the rotation of the spindle 2a is accelerated at the speed fluctuation ratio of the first value (V1) and the deceleration control under which the rotation of the spindle 2a is decelerated at the speed fluctuation ratio of the second value (V2). According to a modification, the rotation controller 21 may alternately exercise acceleration control under which the rotation of the spindle 2a is accelerated to make the speed fluctuation ratio equal to or greater than the first value (V1) and deceleration control under which the rotation of the spindle 2a is decelerated to make the speed fluctuation ratio equal to or less than the second value (V2). Under the acceleration control on the rotation speed of the spindle, the current speed becomes equal to or greater than V1 times the speed one rotation before, so that the occurrence of regenerative chatter vibration can be suppressed, and under the deceleration control, the current speed becomes equal to or less than V2 times the speed one rotation before, so that the occurrence of regenerative chatter vibration can be suppressed. When a period in which the speed fluctuation ratio falls within the range of Th_l to Th_h, both inclusive, can be shortened, another control may be applied between the acceleration control under which the speed fluctuation ratio is made equal to or greater than V1 and the deceleration control under which the speed fluctuation ratio is made equal to or less than V2.

Figure 5A:
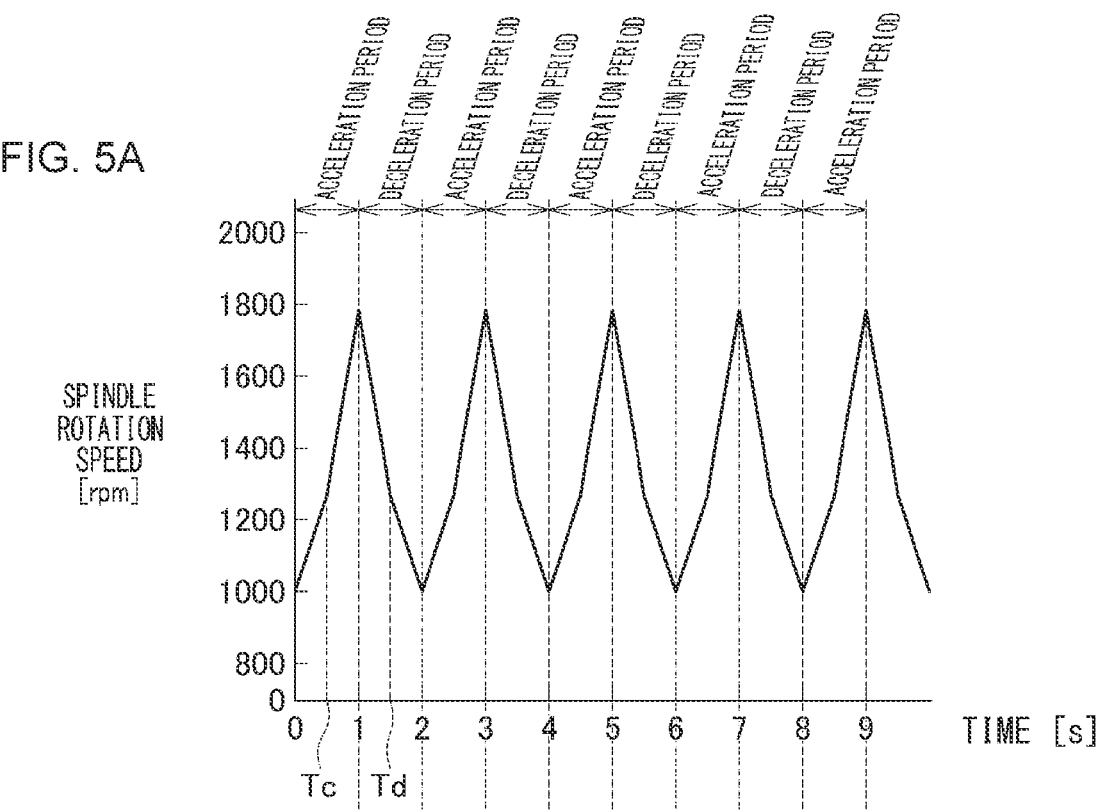
FIGS. 5(*a*) and 5(*b*) are diagrams showing a simulation result when the rotation speed of the spindle is controlled in accordance with a fluctuation pattern according to a modification.

FIG. 5(a) shows a fluctuation pattern of the rotation speed of the spindle according to the modification. The fluctuation pattern of the rotation speed of the spindle according to the modification has a waveform pattern in which the acceleration period from the local minimum value to the local maximum value and the deceleration period from the local maximum value to the local minimum value are equal in length to each other. In this fluctuation pattern, the acceleration period and the deceleration period are each set equal to one second, and the acceleration period and the deceleration period are alternately repeated. As in the embodiment, according to the modification, the rotation controller 21 exercises acceleration control under which average acceleration in the second half of the period of accelerating the rotation of the spindle is made greater than average acceleration in the first half, and deceleration control under which average deceleration in the first half of the period of decelerating the rotation of the spindle is made greater than average deceleration in the second half. Herein, the first half and the second half mean a first period and a second period, respectively, when the period is divided into exactly half.

As shown in FIG. 5(a), the rotation controller 21 increases the acceleration of the rotation of the spindle at a time Tc in the acceleration period. Further, the rotation controller 21 decreases the deceleration of the rotation of the spindle at a time Td in the deceleration period. Therefore, in the acceleration period, the average acceleration in the second half becomes greater than the average acceleration in the first half, and in the deceleration period, the average deceleration in the first half becomes greater than the average deceleration in the second half.

The present discloser has obtained findings showing that, when the rotation speed of the spindle is controlled in accordance with the fluctuation pattern of a triangle wave shown in FIG. 2(a), the period Ia-b in which the speed fluctuation ratio is close to 1 becomes longer near the local maximum value, so that it is obvious that the fluctuation pattern fails to suppress regenerative chatter vibration. From such findings, the present discloser has found out that making the average acceleration in the second half of the period of accelerating the rotation of the spindle greater than the average acceleration in the first half and making the average deceleration in the first half of the period of decelerating the rotation of the spindle greater than the average deceleration in the second half make it possible to shorten a period in which the speed fluctuation ration is close to 1 near the local maximum value.

Figure 5B:
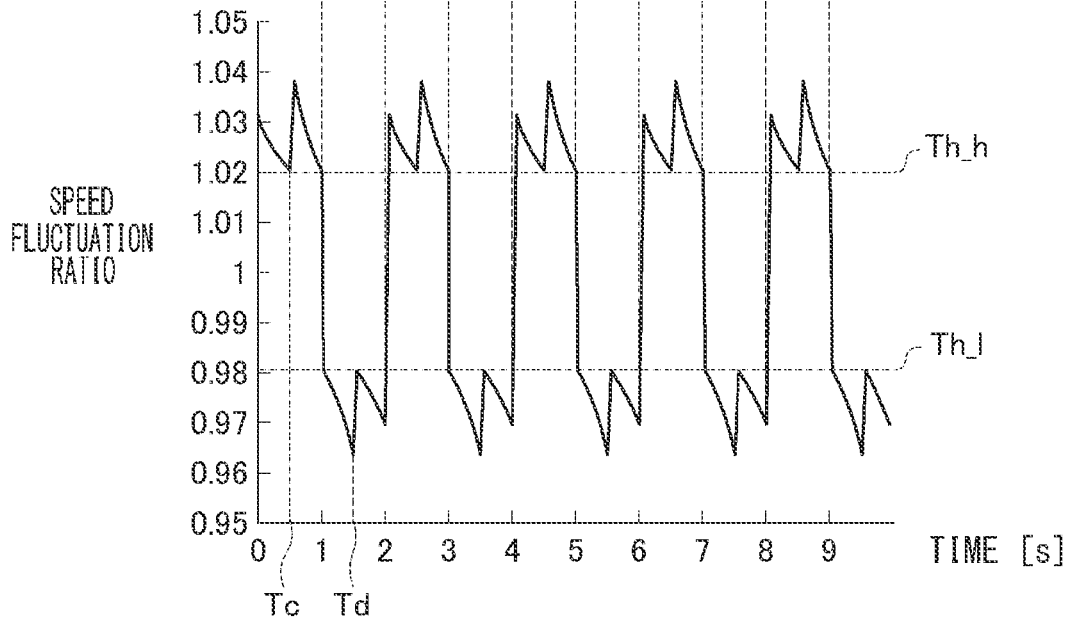

FIG. 5(b) shows a transition pattern of the speed fluctuation ratio in the fluctuation pattern of the rotation speed of the spindle according to the modification. As shown in FIG. 5(a), the rotation controller 21 alternately exercises the acceleration control and the deceleration control to make the period in which the speed fluctuation ratio is close to 1 near the local maximum value of the rotation speed of the spindle extremely short. As described above, according to the modification, the rotation controller 21 alternately exercises the acceleration control under which the acceleration of the rotation of the spindle is increased in a stepwise manner at least once in the period of accelerating the rotation of the spindle and the deceleration control under which the deceleration of the rotation of the spindle is decreased in a stepwise manner at least once in the period of decelerating the rotation of the spindle to effectively suppress the occurrence of chatter vibration. Herein, increasing the acceleration in a stepwise manner means changing the acceleration to higher acceleration after a period of a certain acceleration rate, that is, increasing the acceleration intermittently. Decreasing the deceleration in a stepwise manner means changing the deceleration to lower deceleration after a period of a certain deceleration rate, that is, reducing the deceleration intermittently.

An outline of aspects of the present disclosure is as follows.

The machining apparatus according to one aspect of the present disclosure includes a rotation mechanism structured to rotate a spindle to which a cutting tool or workpiece is attached, a rotation controller structured to control the rotation of the spindle by the rotation mechanism, and a feed mechanism structured to move the cutting tool relative to the workpiece. The rotation controller alternately exercises acceleration control under which the rotation of the spindle is accelerated to make a speed fluctuation ratio between a current cutting speed and a cutting speed one rotation before at the same rotation position equal to or greater than a first value that is greater than 1 and deceleration control under which the rotation of the spindle is decelerated to make the speed fluctuation ratio equal to or less than a second value that is less than 1.

According to this aspect, the rotation controller controls the rotation of the spindle on the basis of the speed fluctuation ratio, so that the occurrence of regenerative chatter vibration can be effectively suppressed. The rotation controller may exercise acceleration control under which average acceleration in the second half of the period of accelerating the rotation of the spindle is made greater than average acceleration in the first half, and deceleration control under which average deceleration in the first half of the period of decelerating the rotation of the spindle is made greater than average deceleration in the second half.

The rotation controller may maintain the speed fluctuation ratio at the first value in at least part of the period of accelerating the rotation of the spindle and maintain the speed fluctuation ratio at the second value in at least part of the period of decelerating the rotation of the spindle. The rotation controller may change the speed fluctuation ratio from the second value to the first value in the period of accelerating the rotation of the spindle and then maintain the speed fluctuation ratio at the first value, and change the speed fluctuation ratio from the first value to the second value in the period of decelerating the rotation of the spindle and then maintain the speed fluctuation ratio at the second value.

The rotation controller may alternately exercise acceleration control under which the acceleration of the rotation of the spindle is continuously increased and deceleration control under which the deceleration of the rotation of the spindle is continuously decreased. Further, the rotation controller may alternately exercise acceleration control under which the acceleration of the rotation of the spindle is increased in a stepwise manner at least once in the period of accelerating the rotation of the spindle and deceleration control under which the deceleration of the rotation of the spindle is decreased in a stepwise manner at least once in the period of decelerating the rotation of the spindle.

A cutting method according to another aspect of the present disclosure includes a rotation control step of controlling rotation of a spindle to which a cutting tool or workpiece is attached, and a machining step of moving, while the spindle is rotating, the cutting tool relative to the workpiece to cause the cutting tool to cut the workpiece. In the rotation control step, acceleration control under which the rotation of the spindle is accelerated to make a speed fluctuation ratio between a current cutting speed and a cutting speed one rotation before at the same rotation position equal to or greater than a first value that is greater than 1 and deceleration control under which the rotation of the spindle is decelerated to make the speed fluctuation ratio equal to or less than a second value that is less than 1 are alternately exercised.

INDUSTRIAL APPLICABILITY

The present disclosure is applicable to a machining field.

REFERENCE SIGNS LIST

1 machining apparatus, 2*a* spindle, 6 workpiece, 7 feed mechanism, 8 rotation mechanism, 10 cutting tool, 20 controller, 21 rotation controller, 22 movement controller.

The invention claimed is:
1. A machining apparatus comprising:
a rotation mechanism configured to rotate a spindle to which a cutting tool or workpiece is attached;
a rotation controller configured to alternately control an acceleration of the rotation of the spindle by the rotation mechanism and control a deceleration of the rotation of the spindle by the rotation mechanism; and
a feed mechanism configured to move the cutting tool relative to the workpiece,
wherein the rotation controller maintains a speed fluctuation ratio between a current cutting speed and a cutting speed one rotation before at the same rotation position at a first value that is greater than 1 in at least part of a period of accelerating the rotation of the spindle and maintains the speed fluctuation ratio at a second value that is less than 1 in at least part of a period of decelerating the rotation of the spindle to suppress growth of chatter vibration.

2. The machining apparatus according to claim 1, wherein the rotation controller changes the speed fluctuation ratio from the second value to the first value in the period of accelerating the rotation of the spindle and then maintains the speed fluctuation ratio at the first value, and changes the speed fluctuation ratio from the first value to the second value in the period of decelerating the rotation of the spindle and then maintains the speed fluctuation ratio at the second value.

3. The machining apparatus according to claim 1, wherein the rotation controller alternately continuously increases an acceleration of the rotation of the spindle and continuously decreases a deceleration of the rotation of the spindle.

4. A machining apparatus comprising:
a rotation mechanism configured to rotate a spindle to which a cutting tool or workpiece is attached;
a rotation controller configured to alternately control an acceleration of the rotation of the spindle by the rotation mechanism and control a deceleration of the rotation of the spindle by the rotation mechanism; and
a feed mechanism configured to move the cutting tool relative to the workpiece,
wherein the rotation controller continuously increases acceleration of the rotation of the spindle in a period of accelerating the rotation of the spindle to make a speed fluctuation ratio between a current cutting speed and a cutting speed one rotation before at the same rotation position equal to or greater than a first value that is greater than 1, and continuously decreases deceleration of the rotation of the spindle in a period of decelerating the rotation of the spindle to make the speed fluctuation ratio equal to or less than a second value that is less than 1.

5. A machining apparatus comprising:
a rotation mechanism configured to rotate a spindle to which a cutting tool or workpiece is attached;
a rotation controller configured to control the rotation of the spindle by the rotation mechanism; and
a feed mechanism configured to move the cutting tool relative to the workpiece,
wherein, when a speed fluctuation ratio between a current cutting speed and a cutting speed one rotation before at the same rotation position is equal to or less than a first threshold that is greater than 1 and is equal to or greater than a second threshold that is less than 1, chatter vibration possibly occur, and
wherein the rotation controller alternately controls an acceleration control of the spindle to make the speed fluctuation ratio equal to or greater than a first value that is greater than the first threshold and a deceleration of the rotation of the spindle to make the speed fluctuation ratio equal to or less than a second value that is less than the second threshold.

6. The machining apparatus according to claim 5, wherein the rotation controller increases, in a continuous manner, acceleration of the rotation of the spindle in a period of accelerating the rotation of the spindle and decreases, in a continuous manner, deceleration of the rotation of the spindle in a period of decelerating the rotation of the spindle.

* * * * *